Dec. 16, 1952    F. UHINK ET AL    2,621,531
LATHE TRANSMISSION
Filed May 1, 1951    3 Sheets-Sheet 1

Inventors:
Josef Irtenkauf, Kurt Fickenscher,
Reinhold Haller, Friedrich Uhink, Friedrich Lautenbach
BY Hmand E Rackenbach
ATTORNEY Dec. 16, 1952  F. UHINK ET AL  2,621,531
LATHE TRANSMISSION Filed May 1, 1951  3 Sheets-Sheet 2

| | | |
|---|---|---|
| 7,1 | | |
| 9 | | |
| 11,2 | | 1:64 |
| 14 | | |
| 18 | | |
| 22,4 | | |
| 28 | | |
| 35,5 | | |
| 45 | | 1:16 |
| 56 | | |
| 71 | | |
| 90 | | |
| 112 | 112 | |
| 140 | 140 | |
| 180 | 180 | 1:4 |
| 224 | 224 | |
| 280 | 280 | |
| 350 | 350 | |
| | 450 | |
| | 560 | |
| | 710 | 1:1 |
| | 900 | |
| | 1120 | |
| | 1400 | |

*Fig. 2*

Inventors
Josef Irtenkauf, Kurt Fickenscher,
Reinhold Haller, Friedrich Uhink, Friedrich Lautenbach
BY
ATTORNEY

Patented Dec. 16, 1952

2,621,531

UNITED STATES PATENT OFFICE 2,621,531

LATHE TRANSMISSION

Friedrich Uhink, Hamburg, Friedrich Lautenbach, Hannover, and Josef Irtenkauf, Kürt Fickenscher, and Reinhold Haller, Goppingen, Germany, assignors to Gebr. Boehringer G. m. b. H., Goppingen/Wurtt., Germany, a limited liability company of Germany Application May 1, 1951, Serial No. 223,881
In Germany May 3, 1950

5 Claims. (Cl. 74—333)

Our invention pertains to a lathe transmission and more particularly to a transmission for driving the work spindle and the lead screw or feed rod of a lathe.

Usually modern type lathes are equipped with a transmission which permits of driving the work spindle at any one of a plurality of speeds constituting a geometrical series. The transmission serving that purpose comprises a plurality of speed change sub-transmissions arranged in tandem, each of said sub-transmissions being alternatively adjustable to one of a number of ratios of transmission, the speeds so obtained being transferred from a transmission shaft to the work spindle at the option of the operator either by way of a belt drive for the purpose of finishing the work-piece or by way of a reduction gearing for the purpose of roughing or cutting threads or the like. The belt drive absorbs rotary oscillations which otherwise are liable to produce undesirable marks on the workpiece. For that reason the operation of the spindle by way of the belt drive is preferred for finishing work. Since, however, roughing work or the cutting of threads requires a much lower speed than finishing work, the reduction gearing is interposed between the transmission shaft and the work spindle. In this manner, the work spindle may be operated at a plurality of different speeds depending on the work to be done, such speeds being so chosen as to constitute substantially a geometrical series, the range of finishing speeds overlapping the range of roughing speeds. Such overlap of the range of speeds enables the operator to either finish a workpiece at a comparatively high speed using the belt drive or to rough the workpiece at a high speed using a carbide tool.

In a known lathe of that type disclosed, for instance, in the German Patent No. 724,258 the reduction gearing connecting the transmission shaft with the work spindle comprises two pairs of gears having a certain ratio of transmission, one of said pairs of gears being adapted to be disengaged when it is desired to drive the spindle by way of the belt drive. Owing to such arrangement the spindle may be driven via the gears at the same number of speeds as are available for operation via the belt drive.

Experience has shown, however, that for the operation of the work spindle by way of the gears a much larger range of speeds is desirable than for the operation of the spindle via the belt drive. Also, experience has shown that the requirements regarding the range of spindle speeds attainable by the gear drive will vary considerably depending on the particular use to which the lathe is to be put.

It is the object of our invention to so construct the lathe transmission that the range of spindle speeds attainable by the gear drive, as distinguished from the belt drive, may be enlarged and may be readily changed when the lathe is assembled to suit the specific wishes of the customers in a simple manner. More particularly, the range of spindle speeds attainable by the gear drive shall be readily variable without thereby modifying the range of speeds attainable by the belt drive and preferably shall be larger than the latter, the available speeds constituting substantially a geometrical series. This object is attained by the provision of two alternative transmission trains between the work spindle and the transmission shaft which may be driven at any one of a plurality of ratios of transmission constituting a geometric series, one of the trains including a belt drive and the other one including a speed reduction gearing, such speed reduction gearing being composed of a pair of exchangeable speed reducing gears and of a shiftable speed reduction gearing settable to a ratio of either 1:1 or 1:4 or thereabouts. The choice of the exchangeable pair of speed reducing gears does not in any way affect the range of speeds available for high speed work performed via the belt drive. However, by appropriately choosing the exchangeable gears in assembling the lathe, the wishes of any particular customer regarding the range of the roughing speeds may be readily complied with.

Moreover, our invention pertains to the transmission for the operation of the lead screw or the feed rod of the lathe. In modern type lathes of the kind to which the present invention relates the drive of such transmission may be derived, at the option of the operator of the lathe, from various sources depending on whether normal work or finishing work or the cutting of coarse threads is to be performed. It is another object of our invention to afford a feed transmission for a lathe in which the feed may be derived from a shaft other than the work spindle for either finishing work with normal feed or extremely fine feed or for the cutting of coarse threads, whereas the feed is derived from the work spindle for all other kinds of work. It is a more particular object of our invention to afford a feed transmission of the kind indicated in which any speed increase is avoided or, in other words, in which any gear is driven by a gear of same or of a smaller diameter, since the efficiency of a transmission is adversely affected by the inclusion in the transmission train of pairs of gears in which a larger gear drives a smaller gear at a higher speed.

Further objects of our invention will appear from a detailed description of a preferred embodiment thereof, whereas the features of novelty will be pointed out in the appended claims.

In the drawings:

Fig. 2 is a table illustrating the available ranges of speeds of the work spindle for normal work and finishing work.

Figure 1:
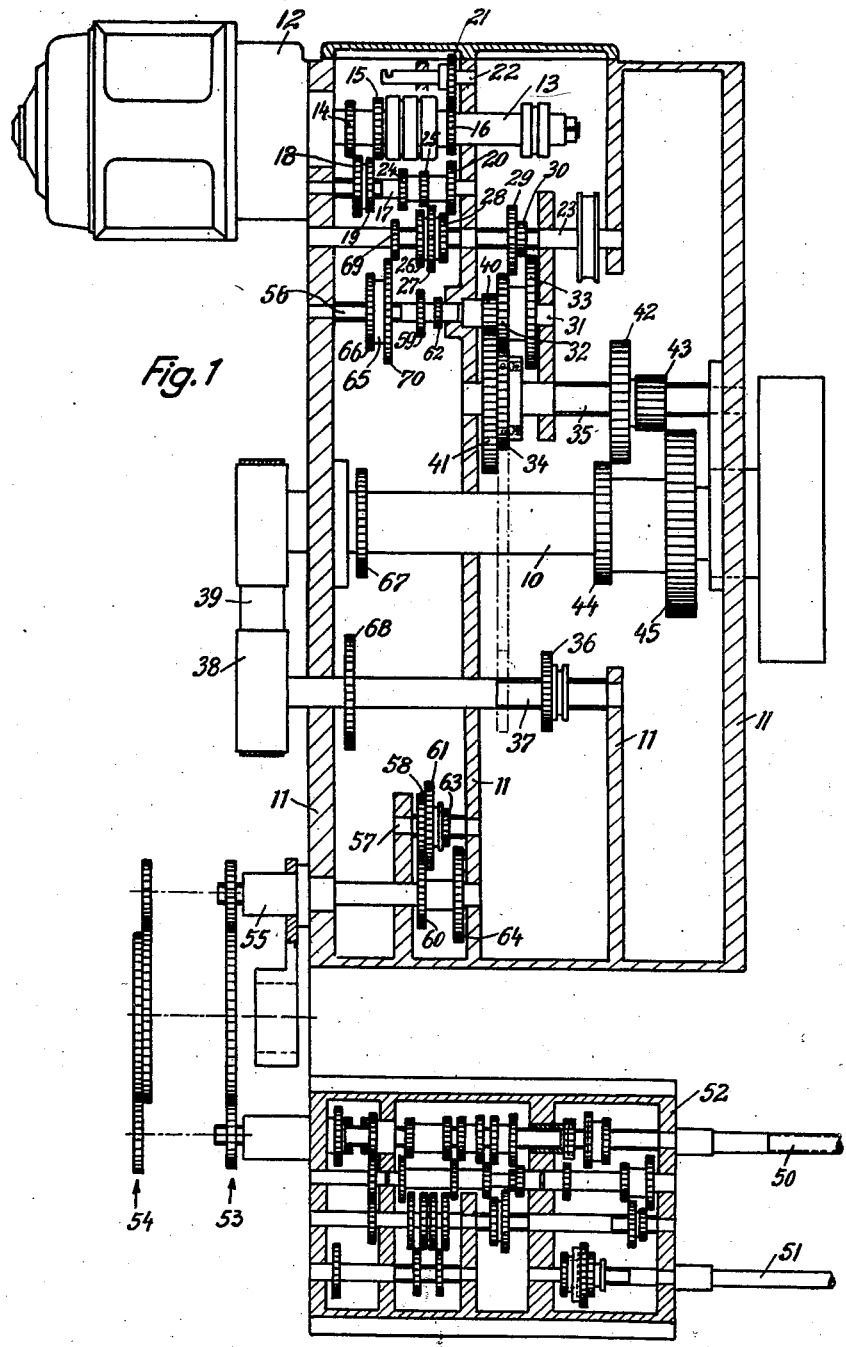
Fig. 1 is a diagrammatic sectional view showing the lathe transmission in the headstock and in the feed train gearing.

The work spindle 10 of the lathe journalled in suitable bearings mounted in transverse walls 11 of the headstock is operated by the transmission to be described hereinafter from an electric motor 12 suitably mounted on the headstock. A shaft 13 extending parallel to the work spindle 10 and suitably journalled in the transverse walls 11 is clutched to the shaft of the electric motor 12 and carries three gears 14, 15 and 16 suitably keyed thereto. A slidable compound gear composed of the individual gears 18, 19 splined to a shaft 17 extending parallel to the work spindle may be so shifted as to alternatively mesh with the gears 14 and 15. The gears 15 and 19 have the same number of teeth, whereas the gears 14 and 18 have a ratio of transmission of 4:5. A gear 20 fixed to the shaft 17 may be co-operatively connected with the gear 16 through the intermediary of a slidable transfer gear 21 loosely mounted on a shaft 22. In this manner, the direction of rotation of the shaft 17 may be reversed when the slidable compound gear 18, 19 is shifted to an intermediate idle position, suitable locking means being provided permitting of an engagement of the slidable transfer gear 21 only when the compound gear 18, 19 assumes its idle position. Since such locking means are well known in the art and familiar to any one versed in lathe transmissions, a detailed description of such locking means is deemed dispensable.

For the purpose of transferring the power to a shaft 23 journalled in the walls 11 and extending parallel to the work spindle, the shaft 17 carries two additional gears 24 and 25 fixed thereto in addition to gear 20. A slidable compound gear composed of the individual gears 26, 27 and 28 is splined to the shaft 23 and may be so shifted that either the gears 20 and 28 having the same number of teeth will mesh, or the gears 25 and 27 will mesh, or the gears 24 and 26 will mesh. In this manner, the shaft 23 may be driven at any one of six speeds appearing in the table shown in Fig. 2 at the bottom thereof, such speeds covering the range from 450 to 1,400. The speeds listed in the table, to wit 1,400, 1,120, 900, 710, 560, and 450 constitute a geometric series, that is to say a series in which the quotient of two successive members of the series is a constant.

While the gears 14, 15, 18, and 19 constitute a first partial transmission and the gears 20, 24, 25, 26, 27, and 28 constitute a second partial transmission, there is provided a third partial transmission comprising another slidable compound gear splined on shaft 23 and comprising the individual gears 29 and 30 and two associated gears 32 and 33 fixed to a shaft 31. Shaft 31 too is journalled in suitable bearings mounted in the walls 11 of the headstock and extends parallel to the work spindle 10. The gears 29 and 32 have the same number of teeth, whereas the gears 30 and 33 have a ratio of transmission of 1:4. As a result, shaft 31 may be driven at any one of $2 \times 3 \times 2 = 12$ different speeds covering the range from 1,400 to 112, as illustrated in the middle column of Fig. 2. It will be noted that the six speeds 112, 140, 180, 224, 280, and 350 are one fourth of the six speeds recited hereinabove and constitute a continuation of the geometric series.

For the purposes of our invention means have been provided to alternatively connect the shaft 31 hereinafter referred to as the "transmission shaft" with the work spindle 10 by way of any one of two transmission trains, one of which includes a belt drive, while the other one includes a speed reducing gearing.

The transmission train including the belt drive which is primarily intended for finishing work at a high speed comprises the following structure: The gear 32 fixed to transmission shaft 31 meshes with a transfer gear 34 freely rotatably mounted on a shaft 35 and adapted to engage a slidable gear 36 splined to a shaft 37. Both of said shafts 35 and 37 extend parallel to the work spindle 10 and are journalled in bearings carried by the walls 11 of the headstock. The shaft 37 projects out of the headstock and outside thereof carries a pulley 38 fixed thereto, such pulley co-operating with a second pulley attached to the end of the work spindle 10 by a suitable belt 39. When the operator shifts the gear 36 into mesh with the loose transfer gear 34 the spindle 10 will be driven via the belt drive 38, 39. The gear 32 has the same number of teeth as the gear 36 and the gear 29. Moreover, the two pulleys of the belt drive have preferably the same diameter. Therefore, the spindle 10 will be driven at the same speed as the transmission shaft 31. Hence, it will appear that, when the belt drive is operative, the work spindle 10 may be operated at any one of the twelve different speeds constituting the geometric series listed in the middle column of Fig. 2.

As stated above, another transmission train may be alternatively used to drive the work spindle 10 from the transmission shaft 23; such alternative train will now be described.

A gear 40 fixed to transmission shaft 31 is in permanent engagement with a gear 41 fixed to a shaft 35. The shaft 35 extends parallel to the work spindle 10 and is suitably journalled in bearings supported by the walls 11 of the headstock. Moreover, the shaft 35 carries a slidable compound gear splined thereto, such compound gear comprising the individual gears 42 and 43 adapted to be shifted to any one of three different positions. The position shown is an idle position, whereas in the two other positions the compound gear meshes with one or the other of two gears 44 and 45 fixed to the work spindle 10. When the operator so sets the various slidable gears as to keep gear 36 in idle disengagement and as to engage the gears 42 or 43 with the gears 44 or 45, the spindle 10 will be driven through gears only, the belt drive 38, 39 driving shaft 37 idly.

The pairs of gears 15, 19 of the first partial transmission, 20, 28 of the second partial transmission, 29, 32 of the third partial transmission, and 32, 36 of the last partial transmission have the same number of teeth operating at the ratio 1:1. When those gears are put in operation they will drive the spindle 10 via the belt drive at the speed of the electric motor 12 which in the present embodiment is 1,400 R. P. M., that being the highest spindle speed as will appear from Fig. 2.

The highest spindle speed attainable through the speed reducing gearing composed of the intermediate shaft 35, the gears 42 to 45 and the pair of speed reducing gears 40, 41, however, is reduced by the function of such pair of gears 40, 41. Since in the present embodiment the gears 40 and 41 have a ratio of transmission of 1:4, the highest spindle speed attainable through such speed reducing gearing amounts to 350 R. P. M., i. e. one quarter of 1,400. The 2×3×2=12 speeds of the shaft 31 are reduced by the pair of gears 40 and 41 and transferred to shaft 35 which is, therefore, driven at any one of the speeds 350 to 28 listed in the left hand column of Fig. 2. Those twelve speeds may be directly transferred to the spindle 10 by shifting the compound gear 42, 43 to the left causing gear 42 to mesh with gear 44 having the same number of teeth. However, a further speed reduction may be effected by shifting the compound gear 42, 43 to the right causing gear 43 to mesh with gear 45 at the ratio of 1:4, whereby the lowest speed of 28 R. P. M. of shaft 35 will result in a spindle speed of 7.1 R. P. M. In this manner, the twelve speeds available for shaft 31 are increased by six additional speeds for normal work requiring the operation of the work spindle through gears, as distinguished from the belt drive.

From the foregoing description of a preferred embodiment of our invention it will appear that it is the ratio of transmission of the pair of gears 40, 41 which determines the overlap of the range comprising the eighteen "gearing drive"-speeds listed in the left column of Fig. 2 and the range of the twelve "belt drive"-speeds listed in the middle column of Fig. 2. By the choice of a suitably proportioned pair of gears 40, 41 we may readily satisfy the wishes of any particular customer regarding the range to be covered by the "gearing drive"-speeds. Moreover, it will appear that such gears 40, 41 do not in any way effect the range of the "belt drive"-speeds which invariably will be the one listed in the middle column of Fig. 2, no matter how the pair of gears 40, 41 is proportioned. Also, it will appear that no matter what ratio of the pair of gears 40, 41 is chosen, all of the available gearing drive speeds will constitute a continuous geometrical series. By exchanging the pair of gears 40, 41, such series will not be interrupted but will be only shifted towards lower speeds or higher speeds, as desired, while leaving the belt drive speeds unaffected. Moreover, it will be noted that with the lathe headstock transmission so far described any gear is driven by a gear of the same or of a smaller number of teeth, whereby any increase of the rotary speed and a consequent reduction of the efficiency of the transmission is avoided.

Figure 3:
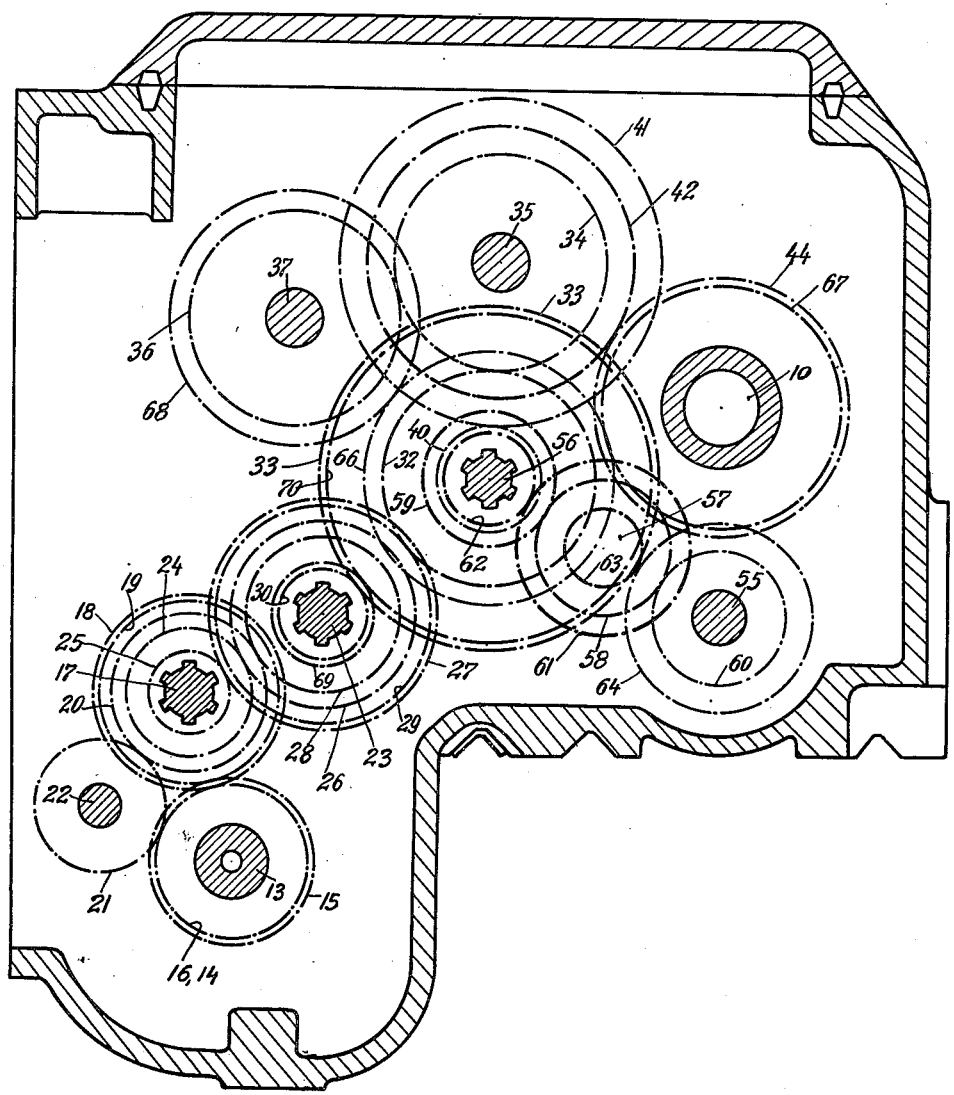
Fig. 3 is a cross section taken through the headstock transmission showing the relative disposition of the various transmission shafts.

While Fig. 1 illustrates the various shafts for sake of simplicity and an easier understanding as being located one above the other, the true relative location of such shafts will appear from Fig. 3. Moreover, no means have been shown for shifting the various compound gears described, since such means are well known in the art and may be readily devised by anyone versed therein.

While the ratio of the pairs of gears 30, 33, 40, 41 and 43, 45 has been described in the present embodiment as being 1:4, it will be readily appreciated that our invention is in no way limited to that particular ratio, but any other ratio may be chosen provided that it is so correlated to the speeds of shaft 23 as to result in an uninterrupted geometrical series of spindle speeds. This will be attained under the following conditions: Where the ratios of transmission of the driving connection that may be optionally established between the driving shaft 13 and the shaft 23 constitute a geometric series covering a total range of $n_1:n_2$, the gears 43 and 45 shall have a ratio of $1:n_1/n_2$. Applying this formula to the present embodiment it will be found that since the speeds of shaft 23 cover the range between 350 and 1,400, the quotient thereof being 1:4, the gears 43 and 45 likewise have the ratio 1:4.

The headstock transmission described hereinabove lends itself in an excellent manner to the combination therewith of a feed transmission affording a wide range of feeds from the largest feed required for the cutting of coarse threads up to the finest feed required in connection with finishing work.

In Fig. 1 we have shown a feed gear box 52 of the type shown and described in an accompanying application filed concomitantly with this application by Josef Irtenkauf and relating to a speed change transmission, particularly for lathes. However, any other feed transmission of orthodox design may be included in the box 52. This transmission serves to drive either a lead screw 52 or a feed rod 51 from a shaft 55 through the intermediary of a set 54 of change gears or a set of change gears. The shaft 55 is suitably journalled in bearings carried by the walls 11 of the headstock and projects outwardly for the attachment thereto of a change gear forming part of the set 53 or the set 54. The shaft 55 which will be termed "outgoing shaft" hereinafter is driven by way of different optional trains from an auxiliary shaft 56 mounted in the headstock walls in alignment with the shaft 31 thereof depending on the particular operation to be performed. For normal feed a slidable compound gear splined on a shaft 57 and comprising individual gears 58, 61 and 63 is so shifted that the gear 58 acts as a transfer gear engaging with a gear 59 fixed to the auxiliary shaft 56 and a gear 60 fixed to the outgoing shaft 55. The gears 59, 58 and 60 have the same number of teeth. For fine feed the compound gear on shaft 57 is so shifted that its gear 61 meshes with a small gear 62 fixed to the auxiliary shaft 56, whereas its gear 63 meshes with a gear 64 of the outgoing shaft 55. In this manner, the outgoing shaft 55 may be driven from the auxiliary shaft 56 either at the ratio of 1:1 or at the ratio of 1:5.

The auxiliary shaft 56 can be driven through various ways depending on whether the belt drive 38, 39 is operative for finishing work or whether the work spindle 10 is driven through the gear drive including gears 42 to 45. In the former alternative the power for driving the auxiliary shaft 56 is derived from the shaft 37 of the belt drive 38, 39 which hereinafter will be termed "pulley driving shaft," whereas, in the latter alternative, such power is derived from the work spindle 10 depending on the setting of a slidable compound gear 65 splined on the auxiliary shaft 56, such compound gear comprising individual gears 66 and 70. Depending on the setting of the compound gear, the gear 66 will mesh either with a gear 68 of same size fixed to the pulley driving shaft 37 or with a gear 67 of equal size fixed to the work spindle 10. Whenever finishing work is to be performed, the auxiliary shaft 56 will be driven from the pulley driving shaft 37. In this manner, gear 67 will be left in disengaged condition and will be thus prevented from transferring oscillations to the work spindle that might cause marks to be produced on the workpiece to be finished.

In conclusion it may be stated that for normal feed and fine feed chosen by suitably setting the slidable compound gear on shaft 57, the feed drive is derived from the work spindle 10 or from the pulley driving shaft 37 via the shafts 56, 57, 55.

We have now provided a third way for driving the auxiliary shaft 56 serving two different purposes, to wit the cutting of coarse threads and, alternatively, the operation with extra fine feed for finishing work. Such third way of driving the feed transmission is afforded by the provision of a driving connection between the auxiliary shaft 56 and the comparatively fast shaft 23 forming part of the speed change transmission connecting the driving shaft 13 with the transmission shaft 31. For this purpose, shaft 23 carries a small gear 69 fixed thereto meshing with a larger gear 70 forming part of a compound gear 65. The ratio of the gears 69, 70 is the same as the ratio of the pair of reducing gears 40, 41. While this ratio of transmission amounts to 1:4 in the present embodiment, it will be selected depending on the particular circumstances and may assume any value between the limits of 1:2 and 1:5. When the gears 69 and 70 are in mesh and when the slidable compound gear 68, 61 and 63 has been shifted to its right hand position, the outgoing shaft 55 will be driven at a comparatively low speed, same being, in the present embodiment, one twentieth of the speed of shaft 23. By driving the work spindle 10 from shaft 23 via gears 29, 32, 34 and 36 and the belt drive, the workpiece may be finished with an extra fine feed making twenty revolutions for one revolution of shaft 55. This operation may be performed at any one of the six highest work spindle speeds available, same varying between 450 and 1,400 in the present embodiment.

The same pair of gears 69, 70, however, may also be used for the cutting of coarse threads. For this purpose, the work spindle 10 is driven at a very low speed via the pairs of gears 30, 33, 40, 41 and 43, 45 having, in the present embodiment, a total ratio of transmission of 1:64. Hence, one revolution of the work spindle is produced by sixty-four revolutions of the shaft 23. It will be readily understood, however, that such sixty-four revolutions may produce an extraordinary long feed, particularly when the gears 59, 50 and 60 are meshing, such feed lending itself readily to the cutting of coarse threads. It is important to note that in producing such long feed no necessity arises of driving any of the gears from a slower gear. In other words, any gear in the transmission described is driven from a gear of the same size or of a smaller size which, as stated above, will result in an extremely high efficiency.

The term "feed spindle" used in some of the claims is intended to cover either one, the lead screw 50 and the feed rod 51.

Having now described our invention with reference to a preferred embodiment thereof, we wish it to be clearly understood that the same is in no way restricted to the details of such embodiment, but is capable of numerous modifications within the scope of the appended claims.

What we claim is:

1. In a lathe, the combination comprising a driving shaft, a transmission shaft, a speed change transmission adapted to optionally establish a driving connection between said shafts at any one of a plurality of ratios of transmission, said ratios constituting substantially a geometric series, a work spindle, two transmission trains adapted to alternatively connect said transmission shaft with said work spindle, one of said transmission trains including a belt drive and the other one of said transmission trains including a speed reducing gearing composed of an intermediate shaft, of gears on said work spindle and said intermediate shaft relatively shiftable to alternatively gear the same to one another at the ratio of 1:1 or 1:4, and of a pair of exchangeable speed reducing gears for driving said intermediate shaft from said transmission shaft at a reduced relative speed.

2. In a lathe, the combination comprising a driving shaft, a transmission shaft, a speed change transmission adapted to optionally establish a driving connection between said shafts at any one of twelve ratios of transmission, said ratios constituting substantially a geometric series, a work spindle, two transmission trains adapted to alternatively establish a driving connection between said transmission shaft and said work spindle, one of said trains including a belt drive and having a ratio of transmission substantially of 1:1 and the other one of said trains including a speed reducing gearing composed of an intermediate shaft, of gears on said work spindle and said intermediate shaft relatively shiftable to alternatively gear the same to one another at the ratio of 1:1 or 1:4, and of a pair of exchangeable speed reducing gears having a ratio of from 1:2 to 1:5 for driving said intermediate shaft from said transmission shaft at a reduced relative speed.

3. In a lathe, the combination comprising a driving shaft, a transmission shaft, a speed change transmission adapted to optionally establish a driving connection between said shafts at any one of a plurality of ratios of transmission, said ratios constituting substantially a geometric series covering a total range of $n_1:n_2$, a work spindle, two transmission trains adapted to alternatively connect said transmission shaft with said work spindle, one of said transmission trains including a belt drive and having a ratio of transmission substantially of 1:1 and the other one of said trains including a speed reducing gearing composed of an intermediate shaft, of two pairs of gears on said work spindle and said intermediate shaft, respectively, mounted to be relatively shiftable to alternatively gear said work spindle and said intermediate shaft to one another at the ratio of 1:1 or $1:n_1/n_2$ and of a pair of exchangeable speed reducing gears for driving said intermediate shaft from said transmission shaft at a reduced relative speed.

4. In a lathe, the combination comprising a driving shaft, a transmission shaft, a speed change transmission adapted to optionally establish a driving connection between said shafts at any one of a plurality of ratios of transmission, said ratios constituting substantially a geometric series, a work spindle, two transmission trains adapted to alternatively connect said transmission shaft with said work spindle, one of said transmission trains including a belt drive having a pulley driving shaft and the other one of said transmission trains including a speed reducing gearing composed of an intermediate shaft, of gears on said work spindle and said intermediate shaft relatively shiftable to alternatively gear the same to one another at the ratio of 1:1 or 1:$m$, of a pair of exchangeable speed reducing gears for driving said intermediate shaft from said transmission shaft at a reduced relative speed, a feed spindle, a feed transmission adapted to drive said feed spindle, an auxiliary shaft, a set of gears establishing a driving connection between said auxiliary shaft and said feed transmission, and means for optionally driving said auxiliary shaft either from said work spindle or from said pulley driving shaft or from said speed change transmission.

5. In a lathe, the combination comprising a driving shaft, a transmission shaft, a speed change transmission adapted to optionally establish a driving connection between said shafts at any one of a plurality of ratios of transmission, said ratios constituting substantially a geometric series, a work spindle, two transmission trains adapted to alternatively connect said transmission shaft with said work spindle, one of said transmission trains including a belt drive having a pulley driving shaft and the other one of said transmission trains including a speed reducing gearing composed of an intermediate shaft, of gears on said work spindle and said intermediate shaft relatively shiftable to alternatively gear the same to one another at the ratio of 1:1 or 1:4, of a pair of exchangeable speed reducing gears for driving said intermediate shaft from said transmission shaft at a reduced speed, a feed spindle, a feed transmission adapted to drive said feed spindle, an auxiliary shaft, two sets of gears adapted to alternatively drive said feed transmission from said auxiliary shaft at different ratios of transmission, and means for optionally driving said auxiliary shaft either from said work spindle or from said pulley driving shaft or from said speed change transmission, said last mentioned means including a pair of gears establishing a driving connected between said speed change transmission and said auxiliary shaft and having substantially the same ratio of transmission as said exchangeable speed reducing gears.

FRIEDRICH UHINK.
FRIEDRICH LAUTENBACH.
JOSEF IRTENKAUF.
KURT FICKENSCHER.
REINHOLD HALLER.

REFERENCES CITED

The following references are of record in the file of this patent:

UNITED STATES PATENTS

| Number | Name | Date |
|---|---|---|
| 2,338,121 | LeBlond et al. | Jan. 4, 1944 |
| 2,464,619 | Siekmann et al. | Mar. 15, 1949 |
| 2,474,104 | Groene et al. | June 21, 1949 |
| 2,523,397 | Siekmann et al. | Sept. 26, 1950 |
| 2,554,721 | Siekmann et al. | May 29, 1951 |